United States Patent [19]
Benjamin et al.

[11] 3,728,037
[45] Apr. 17, 1973

[54] ADJUSTABLE FLOATING REAMER

[75] Inventors: Milton L. Benjamin; Wilbur N. Miles, both of Chagrin Falls, Ohio

[73] Assignee: Erickson Tool Company, Solon, Ohio

[22] Filed: Nov. 4, 1971

[21] Appl. No.: 195,608

[52] U.S. Cl. ............................................... 408/168
[51] Int. Cl. ........................................... B23d 77/04
[58] Field of Search ..................... 408/168, 169, 171, 408/157, 158, 161

[56] References Cited

UNITED STATES PATENTS 2,490,397  12/1949  Aked ................................. 408/168

FOREIGN PATENTS OR APPLICATIONS 589,954  7/1947  Great Britain ....................... 408/161

*Primary Examiner*—Gil Weidenfeld
*Attorney*—Walter Maky

[57] ABSTRACT

An adjustable floating reamer characterized in that a shank member has a slot diametrically thereacross in which overlapping reamer blades are simultaneously adjusted radially outwardly or inwardly by an adjusting sleeve which is rotatable on said shank member and which has threaded engagement with an axially movable cam means engaged with said blades, said adjusting sleeve being spring-biased into frictional engagement with a shoulder on said shank member thus to retain the blade adjustment without additional locking means. Moreover, the present invention is further characterized in that the frictional retaining engagement between the adjusting sleeve and the shank member is increased upon imposition of radial inward load on the reamer blades. Yet another characterizing feature of this invention is the mounting of the blades for radial floating movement about parallel axes which are perpendicular to the slot in which the blades are slidable.

9 Claims, 3 Drawing Figures

ADJUSTABLE FLOATING REAMER

BACKGROUND OF THE INVENTION

In known adjustable reamers the blade adjusting cam means is actuated axially in opposite directions by means of a pair of lock nuts having threaded engagement with the shank member and hence it is a time consuming operation to effect accurate adjustment of the blades because the lock nuts must be loosened and tightened several times before final adjustment is achieved. Moreover, in known adjustable reamers floating of the blades in the shank member slot is provided by a pin and slot connection in the blade adjusting cam means.

SUMMARY OF THE INVENTION

An adjustable floating reamer in which a shank member has a rectangular slot diametrically thereacross in which a pair of juxtaposed overlapping reamer blades are radially adjusted by an axially movable cam means disposed within said shank member, said cam means being axially moved by screw means which are nonrotatably engaged with said shank member and an adjusting sleeve rotatable on said shank member and having threaded engagement with said screw means whereby rotation of said adjusting sleeve in opposite directions is effective to move the cam means in opposite axial directions thus to effect adjustment of the reamer blades. Spring means bearing on said cam means effects, through said screw means, pressing of the adjusting sleeve into frictional engagement with a shoulder of the shank member, whereby said adjusting sleeve is frictionally retained in adjusted position. Moreover, radial inward thrust load on said reamer blades is effective through said cam means to effect even tighter engagement of the adjusting sleeve with the shoulder of the shank member, whereby no loss of adjustment is caused during the reaming operation of a workpiece.

The reamer herein also provides for float of the reamer blades in the shank member slot about parallel pivots to accommodate parallel misalignment of the axes of the shank member and of the workpiece bore which is to be reamed.

Other objects and advantages of the present invention will appear hereinafter.

DETAILED DESCRIPTION OF THE DRAWING

Figure 2:
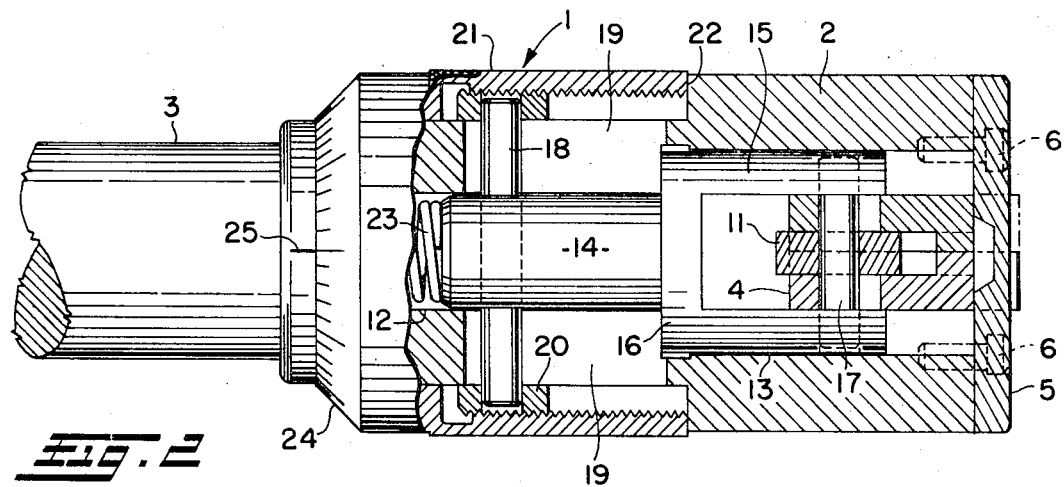
FIG. 2 is a cross-section view taken substantially along the line 2—2 FIG. 1.

The reamer 1 herein comprises a holder 2 having a shank 3 at one end adapted to be secured as in a lathe turret or the like, and having a slot 4 at the other end which is closed by the cap 5 secured to the end of the shank member 2 as by means of screws 6. Radially slidable in said slot 4 are juxtaposed reamer blades 7 having cutting edges 8. The juxtaposed faces of the blades are formed with oppositely inclined grooves 9 with slots 10 therethrough and engaged in such grooves is an axially movable cam block 11 which is in the form of a prism whose bases are slidably engaged with the bottoms of the respective grooves 9 and whose pairs of parallel lateral faces are engaged with the respective parallel sides of the grooves 9.

The holder 2 is formed with a bore 12 and counterbore 13 to receive with clearance the shank portion 14 and the slotted end portion 15 of an actuator 16 which is connected to the cam block or prism 11 by means of the pin 17 which extends diametrically across the slotted end portion 15 and through the prism 11 and the slots 10 in the blades 7.

Figure 1:
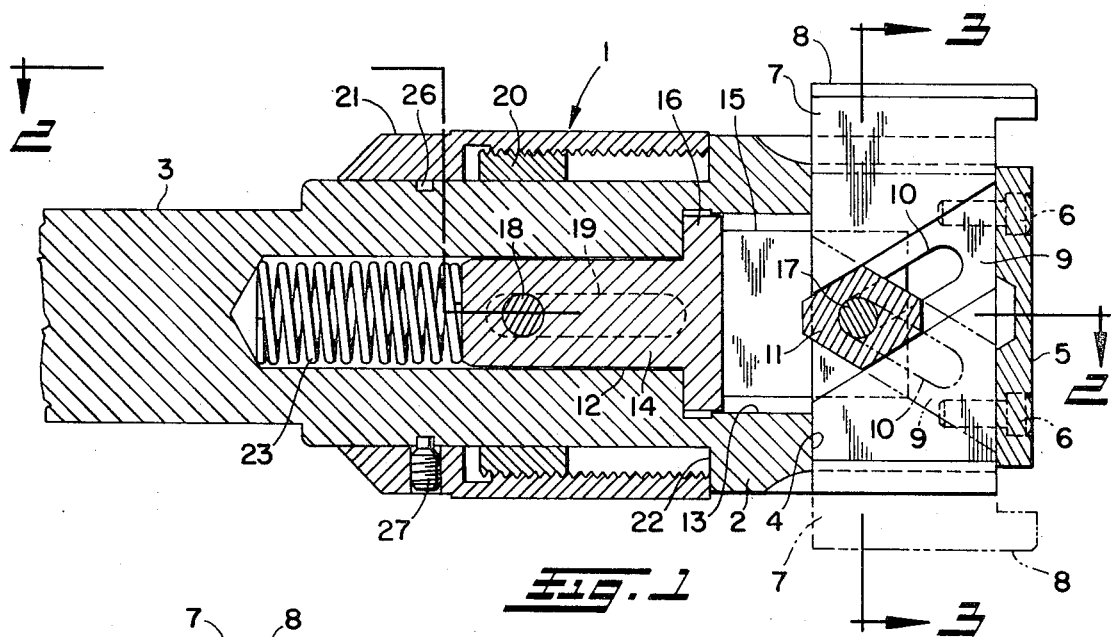
FIG. 1 is a longitudinal cross-section view in a diametral plane passing through the juxtaposed faces of the reamer blades.

As can be seen best in FIG. 1, when the actuator 16 and cam block 11 carried thereby are moved toward the right, the blades 7 will be moved radially inwardly and conversely, when the actuator 16 and cam block 11 are moved to the left, the blades 7 will be urged radially outward.

In order to accomplish such axial movement of the actuator 16, the shank portion 14 thereof has a pin 18 extending diametrically therethrough and through the axial slot 19 in the holder 2 which is perpendicular to the slot 4 in which the blades 7 are radially movable, the ends of the pin 18 being fitted into holes in a screw 20 which is axially slidable on the holder 2. Rotatable on the holder 2 and having threaded engagement with said screw 20 is an adjusting sleeve 21, one end of which abuts a shoulder 22 on the holder 2, such abutting engagement being maintained by the spring 23 within the bore 12 which bears on the end of the shank portion 14 of the actuator 16. The adjusting sleeve 21 is provided with a graduated dial portion 24 which cooperates with a line 25 on the holder 2. When the threads are 40 pitch micrometer threads, when the angles of the sides of the slots 9 are about 26° 34' with respect to the axis of the holder 2, and when there are 50 divisions around the dial portion 24, the rotation of the adjusting sleeve 21 will effect a 0.001 inch change in diameter between the cutting edges 8 for each dial division.

As is now evident, the spring 23 constantly maintains the adjusting sleeve 21 in frictional engagement with the shoulder 22, whereby when it is desired to effect an adjustment of the reamer blades 7 all that it is necessary to do is to rotate the adjusting sleeve 21 in either direction to move the blades 7 radially outward or inward a precise amount as determined by the graduations of the dial 24. The frictional engagement of sleeve 21 with shoulder 22 maintains the adjustment so that no lock nuts or the like are required. Moreover, when the reamer blades 7 enter the hole of the workpiece (not shown) the radial inward thrust load will not cause a change in the cutting diameter of the cutting edges 8 since such load tends to hold the adjusting sleeve 21 in engagement with the shoulder 22 with even greater force.

If desired, the holder 2 may be provided with a peripheral groove 26 in which is engaged the end of a setscrew 27 which is operative to prevent movement of the adjusting sleeve 21 and actuator 16 and cam prism 11 toward the left inadvertently against the pressure of spring 23. Moreover, if it be desired to positively lock the adjusting sleeve 21 against turning, the setscrew 27 may be turned to engage the bottom of the groove 26.

Figure 3:
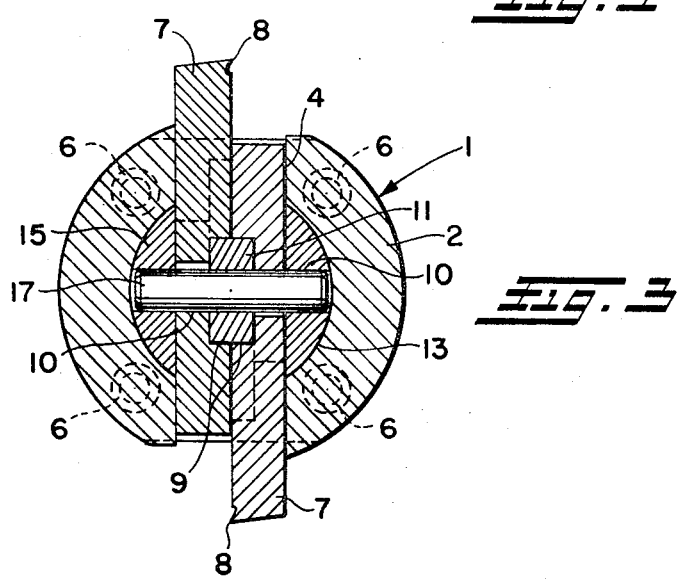
FIG. 3 is a transverse cross-section view taken substantially along the line 3—3, FIG. 1.

With reference to the float feature of the present reamer 1, the clearance of the actuator 16 in the bore 12 and counterbore 13 of the holder 2 enables floating movement of the blades 7 vertically as viewed in FIGS. 1 and 3 about the parallel pivots 17 and 18. The amount of float generally provided may range from about 0.015 inch to about 0.030 inch depending on the size of the reamer 1 and as evident such small amount of float will not cause binding of the blades 7 in the bottom of the slot 4 of the holder 2.

In summary therefore, the present construction is simple and economical to manufacture and in use all that it is necessary to do in order to adjust the reamer blades 7 radially outward or inward is to turn the adjusting sleeve 21 in the desired direction.

We, therefore, particularly point out and distinctly claim as our invention:

1. An adjustable reamer comprising a holder having an axial slot diametrically thereacross; a pair of juxtaposed reamer blades radially slidable in said slot and having cutting edges at their outer extremities; screw actuated cam means engaged with said blades to move the latter simultaneously radially inward or outward in response to axial movement of said cam means in opposite directions in said holder; an adjusting sleeve rotatable on said holder and having screw threaded engagement with said cam means; said sleeve and holder having radially overlapping surfaces; and spring means biasing said surfaces into frictional engagement with each other thus to frictionally retain said sleeve in desired rotary position.

2. The reamer of claim 1 wherein said cam means is arranged so that radial inward thrust load on said blades increases the magnitude of frictional engagement of said radially overlapped surfaces.

3. The reamer of claim 1 wherein said cam means comprises a prismatic cam block having pairs of parallel lateral faces slidably engaged in oppositely inclined grooves in the juxtaposed faces of the respective blades, and an axially movable screw member which at one end straddles the radially overlapped portions of said blades and is connected to said cam block about a pivot axis perpendicular to said blade-receiving slot and which at the other end has a shank portion extending into a bore in said holder, said screw member being nonrotatably connected to said holder by means of a pin extending diametrically therethrough and through an axial slot in said holder which is perpendicular to said blade-receiving slot, the ends of said pin having screw means in threaded engagement with said adjusting sleeve.

4. The reamer of claim 3 wherein said spring means is disposed in the bore of said holder to bear on the shank portion of said screw member, thus to urge the overlapping surfaces of said holder and sleeve into frictional engagement.

5. The reamer of claim 4 wherein said screw member has a radial clearance with the bore in said holder whereby said blades and cam block may float radially of said holder about such pivot axis and said pin.

6. The reamer of claim 1 wherein said sleeve and holder have other radially overlapping surfaces which preclude axial movement of said frictionally engaged surfaces away from each other.

7. The reamer of claim 1 wherein said sleeve has setscrew means engageable with said holder to prevent rotation of said sleeve on said holder except upon loosening of said setscrew means.

8. The reamer of claim 1 wherein said radially overlapping surfaces comprise a shoulder on said holder and the adjacent end of said sleeve.

9. The reamer of claim 8 wherein said cam means, when moved axially toward and away from said blades, respectively actuates the latter radially inwardly and outwardly; and wherein inward thrust load on said blades tends to draw said sleeve toward said blades to effect tight engagement of the end of said sleeve with said shoulder.

* * * * *